April 9, 1968 B. D. SOLOMON 3,377,469

ELECTRONIC COUNTING APPARATUS

Filed Sept. 4, 1964 3 Sheets-Sheet 1

INVENTOR.
BERTRAM D. SOLOMON
BY Forrest J. Lilly
ATTORNEY

April 9, 1968 B. D. SOLOMON 3,377,469

ELECTRONIC COUNTING APPARATUS

Filed Sept. 4, 1964 3 Sheets-Sheet 2

INVENTOR.

BY BERTRAM D. SOLOMON

Forrest J. Lilly

ATTORNEY

| DECADE COUNTER SUCCESSION SEQUENCE | |
|---|---|
| COUNTER ELEMENTS MORE CONDUCTIVE | COUNT |
| A, B | 0 |
| A, C | 1 |
| B, C | 2 |
| B, D | 3 |
| C, D | 4 |
| C, E | 5 |
| D, E | 6 |
| D, A | 7 |
| E, A | 8 |
| E, B | 9 |

| DECADE COUNTER SUCCESSION CONTROL | |
|---|---|
| COUNTER ELEMENT TURNED OFF | CONTROL ELEMENTS |
| A | B, D |
| B | C, E |
| C | D, A |
| D | E, B |
| E | A, C |

INVENTOR.
BERTRAM D. SOLOMON
BY Forrest J. Lilly
ATTORNEY

United States Patent Office 3,377,469
Patented Apr. 9, 1968

3,377,469
ELECTRONIC COUNTING APPARATUS
Bertram D. Solomon, 2016 Corning St.,
Los Angeles, Calif. 90034
Filed Sept. 4, 1964, Ser. No. 394,455
10 Claims. (Cl. 235—92)

ABSTRACT OF THE DISCLOSURE

Electronic counting apparatus including a plurality of active electronic counter elements in excess of three, each counter element being capable of exhibiting two stable and distinguishable states. Gating means selectively change the stable states of predetermined counter elements, one at a time upon receipt of a counting pulse, and independent condition interchange means responsive to the change of state of one of the counter elements by the gating means induces a predetermined one of the other counter elements into the stable state assumed by the first counter element prior to receipt of the counting pulse. The condition interchange means may take the form of turn-on filters, or a combination of turn-on and turn-off filters.

Figure 1:
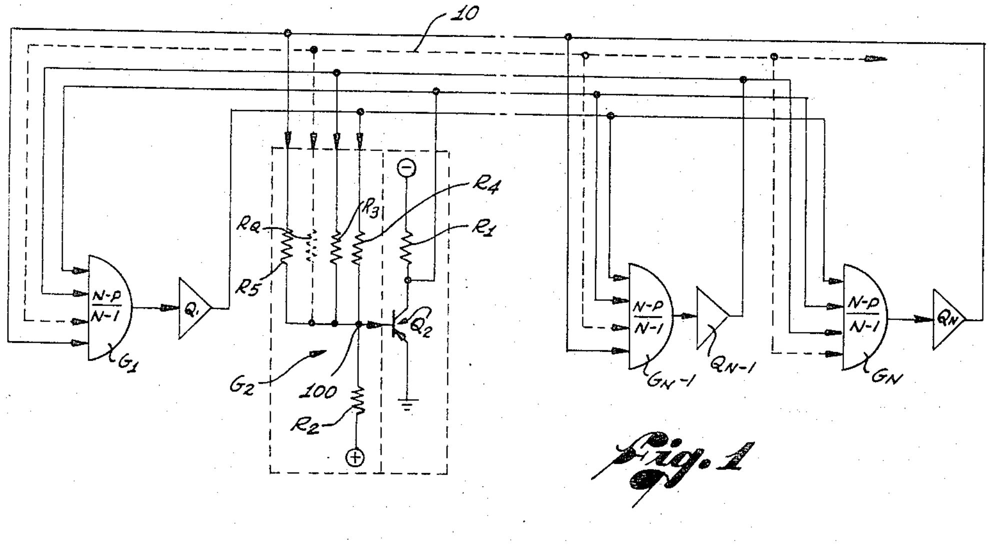

This invention relates generally to electronic register and counting devices. More particularly, this invention relates to novel improvements in digital registers and counters of the type wherein different combinations of a fixed number P out of a total available number N of active electronic elements, each of the P elements being in a prescribed one of two distinguishable stable states, are used to designate different numerical states. Such digital registers and counters are hereinafter referred to as P out of N registers and counters.

In order to count M impulses digitally, it is necessary to provide a device which exhibits M stable and time-independent states, each individual stable state being distinguishably distinct from each of the remaining M–1 stable states. Such an M-stable device is referred to in the computer arts as a register. A register becomes a counter if count succession means are added to cause each impulse received by the counter to induce a succession from one stable state of the register to the next predetermined one of the M stable states of the register, each successive group of M impulses producing a predetermined and orderly progression through all of the M stable states exhibited by the register within the counting system. The counter is commonly provided with means for producing an output impulse or "carry" to indicate succession to a particular one of its M stable states, typically the succession from the "9" to the "0" state. Hence, each carry impulse indicates a group of M input pulses counted, the number of carry impulses thus representing a division by the factor M.

The aforedescribed digital registers and counters have found a wide range of applications in modern technological areas, including information depositories, computer systems, measuring instruments and the like. In many instances, it is desirable to make numerical presentations to a human observer. Ideally, such presentations should be easily interpreted and, hence, decade counters and a decimal format are frequently employed for such presentations. Although other formats can be used, e.g., a binary format, such formats are not nearly so intuitive and easily interpreted by most human observers. Hence, a great deal of time, effort and expense have been expended by designers in an effort to provide improved decade counting systems.

On popular approach used in the computer arts for implementing a decade counter has been to cascade four two-state circuits or "binaries." Each binary typically comprises a flip-flop using two active electron elements, such as transistors, electron tubes or the like, connected together to form a bistable device. The four binaries are capable of counting $2^4$ or 16 impulses, and 6 of these 16 possible counter states are deleted in the decade counter to leave the required 10 states remaining. Since each of the four binaries requires two active electron elements, it will be apparent that a total of at least eight active electron elements are required for each count of 10 stage of the decade counting system.

The intensified interest in recent years in integrated circuits calling for extremely compact electronic assemblies has stimulated the quest for improved digital counters which require less than the eight active electron elements per count of 10 required by the conventional four-binary decade counter. In order to reduce the number of active elements required by the decade counting system, attention has been directed to P out of N registers and counters. In this connection, if N active electron elements are interconnected so that P out of N elements are in one condition and the remaining $N-P$ elements are in another condition distinguishable from the first condition, then the number of distinct stable states which the system can assume is:

$$\frac{N!}{P!(N-P)!}$$

This represents the number of combinations of P or $N-P$ out of N elements where $(N-1)>P>1$, and N and P are both integers.

For 2 out of 5 active electron elements in one electrical state and the other 3 remaining elements in another electrical state distinguishable from the first electrical state referred to, the number of possible stable states exhibited by the register or counter is:

$$\frac{5!}{2!(3)!}=10$$

Hence, a decade counter can be realized using only 5 active electron elements, a net saving of 3 active elements over the four-binary type of decade counter previously described.

Examples of such generalized P out of N counting systems and 2 out of 5 decade counters are disclosed in U.S. Patents Nos. 2,912,578 and 2,922,034 of H. C. A. Van Duuren et al., issued Nov. 10, 1959, and Jan. 19, 1960, respectively. However, although such P out of N and 2 out of 5 counting systems have successfully reduced the number of active electron elements required, this has only been accomplished by introducing additional circuit complications which in some ways tend to offset the advantages of reducing the number of active elements required. In this regard, while the P out of N counting systems set forth in the aforedescribed patents do represent an improvement over the conventional four-binary decade counter, the systems disclosed involve relatively complex stability and count succession systems which require a considerable increase in the number of passive components, e.g., diodes and the like, required to implement the P out of N counting arrangement.

Moreover, in the P out of N counters heretofore disclosed by the prior art, it has been the usual practice to interconnect the count succession system with the stability system so that the former directly drives the latter and can influence the state of conductivity of the active electron elements of the counter only via the stability system. Unfortunately, such an arrangement does not always have the desired speed of response in transferring from one counter state to another. Hence, those concerned with the development of electronic registers and counters, and particularly P out of N digital registers and counters, have long recognized the need for further improvements in such systems.

Accordingly, it is an object of the present invention to provide new and improved digital registers and counters which overcome the above and other disadvantages of the prior art.

Another object is to provide new and improved P out of N registers and counters which are relatively simple, economical and reliable.

A further object is to provide new and improved P out of N registers and counters capable of exhibiting $$\frac{N!}{P!(N-P)!}$$

unique and stable states, where $(N-1)>P>1$ and both N and P are integers.

Still another object of the present invention is the provision of new and improved 2 out of 5 electronic registers and counters capable of exhibiting 10 unique and stable states.

Yet another object of this invention is to provide P out of N digital registers and counters with improved stability systems.

A still further object of this invention is the provision of new and improved P out of N electronic counters capable of enhanced speed of response in changing counter states upon receipt of a counting impulse.

Another object of the present invention is the provision of P out of N counters with improved count succession systems.

A still further object is to provide a new and improved P out of N electronic counter wherein the count succession system acts directly upon the active electron elements of the counter to change their states rather than acting indirectly through the stability system.

Still another object of this invention is to provide new and improved 2 out of 5 decade counters which require a minimum number of active electron elements.

Figure 2:
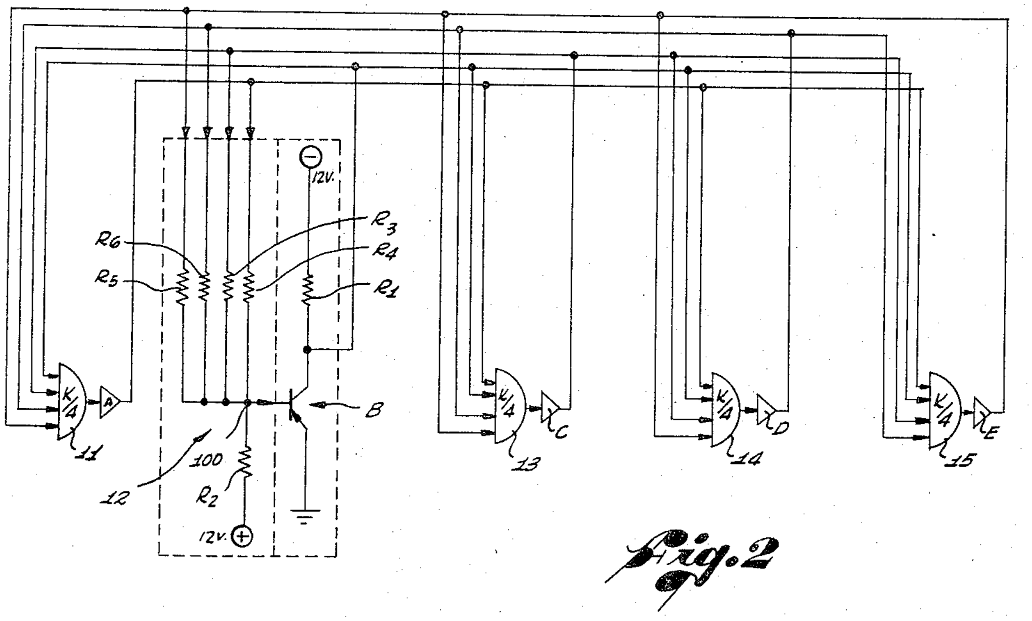
Figure 3:
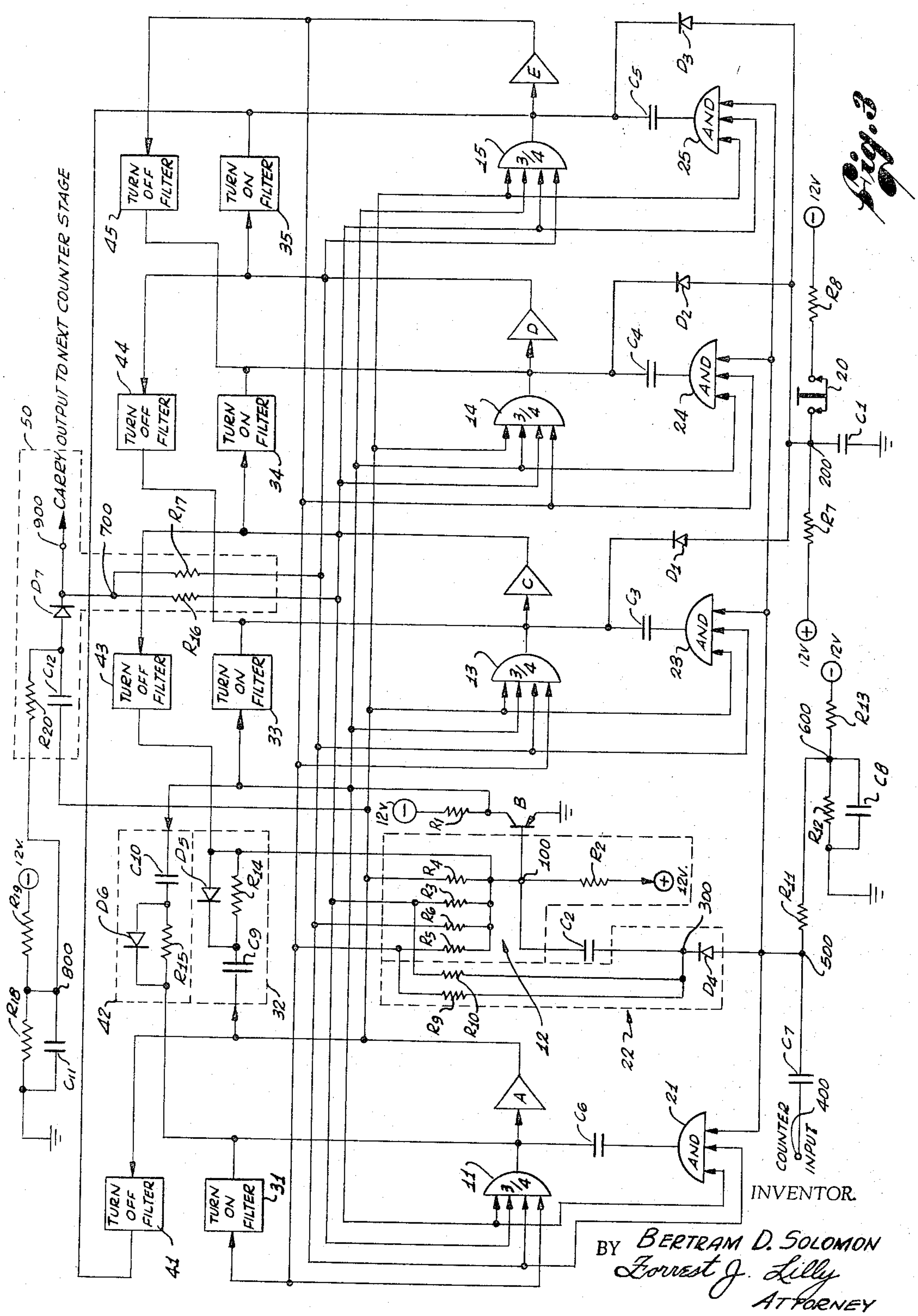
Figures 4, 4A, 4B, 4C, 4D, 4E, 4F, 4G, 4H, 4I, 5, 6:
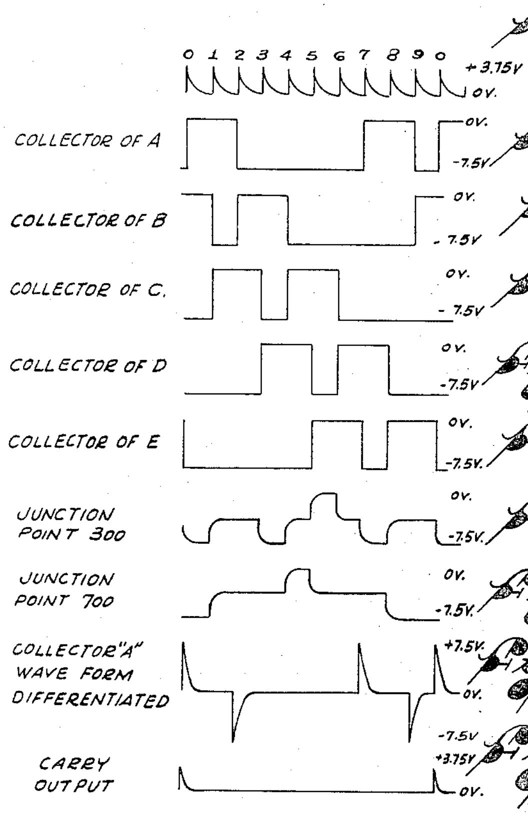

The above and other objects and advantages of this invention will be better understood by reference to the following detailed description, when considered in connection with the accompanying drawings of illustrative embodiments thereof, and wherein:

FIG. 1 is a combined electrical schematic and block diagram of a generalized P out of N register in accordance with the present invention;

FIG. 2 is a combined electrical schematic and block diagram of a 2 out of 5 register in accordance with the present invention wherein 2 of the 5 active register elements are in a different state of electrical conductivity than the other 3 active register elements;

FIG. 3 is a combined electrical schematic and block diagram of a single count of 10 stage of a 2 out of 5 decade counter in accordance with the invention;

FIGS. *4a–4i* illustrate pertinent voltage waveforms for the 2 out of 5 decade counter shown in FIG. 3, including waveforms for each of the five active counter elements;

FIG. 5 is a table of counter element pairs representative of the various counter states; and FIG. 6 is a table of counter element pairs which control the gating of the count succession means to each counter element.

Referring now to the drawings, and particularly to FIG. 1 thereof, there is shown a P out of N register comprising a total of N active electron register elements $Q_1$, $Q_2$ . . . $Q_{N-1}$, $Q_N$. The conductive condition of each of these active elements $Q_1$–$Q_N$ is controlled by one of a group of plurality gates $G_1$–$G_N$, respectively, which interconnect the active elements comprising the register so that some register elements control the conductive condition of other register elements. A plurality gate is herewith defined as a gate with $N-1$ inputs and which maintains its associated active register element stable in one condition when fewer than $N-P$ of its $N-1$ inputs are activated in a predetermined manner, and which maintains its associated register element stable in another condition when $N-P$ or more of its $N-1$ inputs are activated in the same particular manner. Hence, each active register element responds through its respective plurality gate to a certain plurality of any of its gate inputs.

By way of example, each of the active register elements $3_1$–$Q_N$ is shown to be a PNP transistor. However, it will be apparent to those of ordinary skill in the art that other active electron elements, e.g., electron tubes or the like, may be readily substituted for the transistor register elements.

The most readily apparent distinguishable conditions for each of the transistor register elements $Q_1$–$Q_N$ to assume are the saturation and cut-off electrical states, and these states are conveniently used by the P out of N registers and counters of the present invention. However, it will be apparent that any two distinguishably different current conducting conditions may be utilized to indicate the two different states of each register element. It is merely necessary to use high and low current conditions which are sufficiently divergent as to be readily distinguishable.

The electrical schematic for the plurality gate $G_2$ of the register element $Q_2$ is indicated within the dotted enclosure of FIG. 1. In this regard, all of the active register elements $Q_1$ . . . $Q_N$ and all of the plurality gates $G_1$ . . . $G_N$ are identical.

Each of the $N-1$ inputs of each plurality gate is connected to the output of a register element other than the register element with which the specific plurality gate is associated. Hence, the inputs of the plurality gate $G_2$ are obtained from the outputs of the register elements $Q_1$ and $Q_3$ through $Q_N$, no input being received by the gate $G_2$ from the output of its associated register element $Q_2$.

The transistor of the register element $Q_2$ has its collector electrode connected to a source of negative potential through a collector load resistor R1, the base electrode of the transistor being connected through a bias resistor R2 to a source of positive potential. The emitter electrode of the transistor is grounded.

The base of the transistor $Q_2$ is also connected to the plurality gate inputs through identical resistors R3, R4, R5 . . . $R_Q$. The resistor $R_Q$ is shown in phantom and is connected to a phantom bus 10 which indicates a connection to the output of any active register element between $Q_2$ and $Q_{N-1}$. In this regard, the plurality gate $G_2$ includes a separate input and resistor such as $R_Q$ for each such active register element between $Q_2$ and $Q_{N-1}$.

It will be noted in FIG. 1 that each of the plurality gates $G_1$ . . . $G_N$ is labeled as being an $$\frac{N-P}{N-1}$$

gate. As previously pointed out, this indicates that each gate has $N-1$ inputs and that any $N-P$ of these inputs will, when activated in a particular manner, maintain the associated active register element in a conductive condition. On the other hand, when less than $N-P$ of the plurality gate inputs are activated in the specified manner, the active register element assumes a condition of lower electrical conductivity. In this connection, the resistors R2, R3, R4, R5 . . . $R_Q$ form an adding network for summing the current at the junction 100 of these resistors with the base electrode of the transistor $Q_2$.

Let us assume that P out of the N register elements are in saturation and that element $Q_2$ is among the saturated elements. Then $N-P$ register elements must, of necessity, be cut off. The collectors of these cut-off transistors are pulled up to a high negative potential (somewhat less than the full potential of the negative collector source) through collector load resistors (not shown) analogous to R1 for register element $Q_2$. As a result, $N-P$ of the inputs of specific plurality gates, including gate $G_2$, are pulled up to this same level of negative potential. The remaining inputs of these same specific plurality gates are removed from ground potential by no more than the saturation potential of the transistor collectors connected thereto. The values of the summing resistors R3, R4, R5 . . . $R_Q$ and the resistor R2 are selected so that sufficient base current is supplied to their associated transistor $Q_2$ to maintain the latter transistor in saturation whenever $N-P$ of the plurality gate inputs are pulled to the high negative potential. A minimum current amplification factor for the transistor $Q_2$ is assumed. Moreover, the value of the collector load resistors analogous to R1 determines the values of the summing resistors R3, R4, R5 . . . $R_Q$. For those plurality gates having fewer than $N-P$ of the inputs pulled up to maximum negative potential, the junction 100 of the summing network is maintained at some positive voltage with respect to the emitter of the associated transistor and, hence, the transistor is cut off. Resistor values are chosen which are compatible not only with the saturation condition but also with the cut-off condition.

Each of the plurality gates $G_1$ . . . $G_N$, in association with its respective transistor register element $Q_1$ . . . $Q_N$, in essence functions as a voltage level detector. Each additional input of a plurality gate which is pulled up to the maximum negative potential level forces the summing junction at the base of the associated transistor more negative. When the voltage level of the summing junction crosses in a negative going direction the potential level of the transistor emitter, the associated transistor is forced from its cut-off state to some conducting state since the base of the PNP transistor is no longer positive with respect to its emitter. Whether or not the potential level at the summing junction is more positive or more negative than the emitter potential of the associated transistor is a function of whether $N-P-1$ or fewer of the respective plurality gate inputs are pulled to the maximum negative collector potential or whether $N-P$ or more of the plurality gate inputs are pulled to this maximum negative potential.

In lieu of the aforedescribed resistive plurality gate arrangement, other voltage level sensing arrangements can be utilized without departing from the spirit and scope of the present invention, e.g., resistors in conjunction with a tunnel-diode which in turn controls the state of some active electron element. In this regard, any detecting arrangement which maintains one register element condition stable for $N-P$ or more gate inputs at a particular voltage level per input and which maintains another register element condition stable for $N-P-1$ or fewer gate inputs at the same particular voltage level per input will suffice. However, the resistor-transistor plurality gate arrangement is a presently preferred embodiment by reason of economy.

Referring now more particularly to FIG. 2, there is shown a 2 out of 5 register utilizing 5 active electron elements A, B, C, D and E. Each of these register elements utilizes as the active electron device a PNP junction transistor, such as the type 2N1307 transistor manufactured by Texas Instruments, Inc. The potential at the base of the transistor in each of the register elements A, B, C, D and E, e.g., at the summing junction 100 for the register element B, is controlled by a plurality gate 11, 12, 13, 14 and 15, respectively, for each register element. The positive and negative supply voltages are typically +12 volts and −12 volts, respectively. The resistors R1–R5 in FIG. 2 correspond to the resistors R1–R5, respectively, in FIG. 1, and the resistor R6 in FIG. 2 corresponds to the plurality gate resistor $R_Q$ in FIG. 1. With the exception of the plurality gate resistor values, the electrical circuit shown in FIG. 2 is exactly the same for a 2 out of 5 register having 2 register elements conducting and 3 elements cut off as for a 2 out of 5 register having 2 elements cut off and 3 register elements conducting. In this connection, the register is capable of assuming 10 stable states for $N=5$ and $P=$either 2 or 3. The ten unique combinations of two register elements in a stable condition different from the remaining three elements are: AB, AC, BC, BD, CD, CE, DE, DA, EA and EB. These states are tabulated in FIG. 5.

The first case considered for the 2 out of 5 register shown in FIG. 2 is one with 2 register elements in saturation and the remaining 3 register elements cut off. If A and B are the saturated register elements then elements C, D and E are cut off. For plurality gate 12, three of the four summing resistors are connected to the collectors of cut-off transistors. These summing resistors are: R5 connected to E, R6 connected to D, and R3 connected to C. R4 is connected to the collector of A, but A is in saturation. Hence, three of the four summing resistors in plurality gate 12 are pulled to a high negative potential (typically −7.5 volts) through the collector load resistors (not shown) of register elements C, D and E. The input end of R4 is removed from ground by no more than a few tenths of a negative volt because this end is connected to the collector of register element A which is in saturation.

Summing junction 100 of plurality gate 12 is pulled sufficiently negative by three of the four summing resistors to supply base current to register element B. The function of resistor R2 is to set the summing junction 100 at some positive potential with respect to ground whenever only two of the summing resistors in the plurality gate are pulled to their maximum negative potential. The three of the four summing resistors supplying current to summing junction 100 must supply base current for element B and, in addition, the current which flows through R2 by virtue of the potential difference existing across the latter resistor.

In a like manner, plurality gate 11 will maintain register element A in a saturation for element B in saturation and elements C, D and E cut off. A different input to gate 11 is connected to each of the collectors of register elements C, D and E for a total of three of the four inputs. The fourth input to gate 11 is connected to the saturated collector of element B. Thus, register element A is also held in saturation by the three of the four gate inputs pulled to the maximum negative potential of 7.5 volts through the collector load resistors of elements C, D and E.

It will be noted that the plurality gates, all of which are identical, are labeled as K/4 gates. In this regard, K can equal either 2 or 3. Hence, if $K=2$, each plurality gate will respond to any 2 of its 4 inputs being pulled to maximum negative potential to set its associated transistor register element in saturation. For $K=2$, the gate designation is read as a 2 out of 4 gate. For $K=3$, the gate designation is read as a 3 out of 4 gate.

Where two register elements are to be maintained in saturation and three register elements are to be maintained in the cut-off state, the plurality gates are all 3 out of 4 gates. On the other hand, for a 2 out of 5 register where three register elements are maintained in saturation and two register elements are cut off, the plurality gates are all 2 out of 4 gates. For a 3 out of 4 gate, whenever only two of its summing resistors are pulled to their maximum negative potential through the load resistors of cut-off register elements, the summing junction is positive with respect to ground and, since the emitter of the associated PNP transistor register element is connected to ground, the transistor base is positive with respect to the emitter and the register element is cut off. However, whenever three of the gate's summing resistors are pulled to their maximum negative potential through the load resistors of cut-off register elements, sufficient base current to maintain saturation is supplied to the associated transistor register element in addition to current through the pull-down resistor, e.g., R2, connected to the positive 12 volt supply. Typical resistor values for the plurality gate 12 and register element B which enable both of the aforedescribed functions to be accomplished are:

| | Kilohms |
|---|---|
| R1 | 1 |
| R2 | 3.9 |
| R3 | 5.6 |
| R4 | 5.6 |
| R5 | 5.6 |
| R6 | 5.6 |

The type 2N1307 transistor has a minimum beta or current amplification ratio sufficient for the intended functions.

The component values for all other register element and plurality gate stages are identical to those set forth above for the register element B and the plurality gate 12.

Let us assume now that register elements C and D are placed in saturation. All of the plurality gates are 3 out of 4 gates. Resistor R6 in plurality gate 12 is connected to the output of register element D and resistor R3 is connected to the output of register element C. Since elements C and D are both in saturation and plurality gate 12 is a 3 out of 4 gate, register element B must be cut off. Similarly, it can be shown that register elements A and E are also cut off. Register elements C and D provide two of the four inputs of not only plurality gate 12 but also gates 11 and 13. Since all of the plurality gates are of the 3 out of 4 type and since two of the four inputs of gates 11 and 13 as well as gate 12 are connected to the collectors of saturated transistors, these gates 11 and 13 also maintain their associated register elements A and C, respectively, cut off.

Since all summing resistors are of equal value in each plurality gate, and all plurality gates are identical, any three of the four inputs of a specific 3 out of 4 plurality gate pulled to their maximum negative potential through the load resistors of cut-off register elements will set the associated register element transistor of the specific gate in saturation. Moreover, if only two of the four inputs of any particular 3 out of 4 plurality gates are so energized, then the associated register element transistor is maintained in the cut-off state.

For a register having N active electron elements, each plurality gate will have $N-1$ inputs and the gate will be responsive to $N-P$ of its inputs to maintain the associated active element stable in a particular condition. The number of different register combinations which will affect a particular plurality gate to maintain its active element stable in a conductive condition can be determined by a consideration of the general formula for the number of combinations of N things taken P at a time. In terms of the P and N as defined for a register of N elements, the total number of things now is $N-1$ which is the number of plurality gate inputs. These gate inputs are activated $N-P$ at a time. If L is the number of different register combinations which will affect a particular plurality gate to maintain its active element stable in a conductive condition then:

$$L=\frac{(N-1)!}{(N-P)!(P-1)!}$$

For 2 out of 5 register elements in saturation, $P=2$, $N=5$, and $L=4$.

Hence, each register element will be in saturation for four of the ten possible combinations. If the ten unique combinations of two register elements in a condition different from the remaining three elements are assumed to be combinations of two saturated transistor register elements, it will be observed from the table of FIG. 5 that element B appears only in the four combinations AB, BC, BD and EB. Similarly, it can be shown that all of the other register elements also appear in only four different combinations.

The analysis for register element B and its plurality gate 12 is by analogy applicable to all the other register elements and their respective plurality gates. Because each register element and its associated plurality gate is the same as any and every other register element and its associated plurality gate, the analysis is also valid for any re-naming of the register elements. Hence, the validity of the analysis is independent of the designations assigned to the register elements.

The embodiment of a 2 out of 5 register wherein three register elements are insaturation and the remaining two register elements are cut off is next considered. For each plurality gate $K=N-P=2$, so that all of the plurality gates are of the 2 out of 4 type. In this connection, the register of FIG. 2 can be considered to be either a 2 out of 5 register or a 3 out of 5 register depending upon whether or not P refers to non-conductive or conductive states, respectively. For purposes of the present illustration, P is arbitrarily made equal to the number of saturated register elements rather than the number of cut-off elements.

A 2 out of 4 plurality gate must maintain its associated register element in saturation whenever any two of its four summing resistors are pulled to their maximum negative potential through the load resistors of cut-off register elements, and the gate must maintain its associated register element cut off whenever less than two of its four summing resistors, i.e., only one input, is pulled to the maximum negative potential. Typical resistor values for a 2 out of 4 plurality gate 12 and its associated register element B are the same as those previously listed for a 3 out of 4 plurality gate with the exception of the value of resistor R2 which is equal to 7.5 kilohms in the 2 out of 4 plurality gate case.

By way of example, A, B and C are assumed to be the saturated register elements and, hence, elements D and E are cut off. Since both register elements D and E are cut off, resistors R5 and R6 of the plurality gate 12 are both pulled to their maximum negative potentials of −7.5 volts. Thus, since plurality gate 12 is a 2 out of 4 gate, register element B is in saturation. Similarly, since gates 11 and 13 also have two out of their four inputs connected to the collectors of elements D and E, their respective register elements A and C are also maintained in saturation. The saturated collectors of register elements A, B and C provide three of the four inputs to each of the plurality gates 14 and 15. Consequently, these latter gates maintain their associated register element transistors D and E cut off.

For a 2 out of 4 gate, if only a single one out of the four inputs to the gate is pulled to its maximum negative potential through the load resistor of a cut-off register element, the summing junction of the gate will be positive with respect to ground. Hence, since the emitter of the associated PNP junction transistor register element is connected to ground, the transistor base is positive with respect to the emitter and the register element is maintained cut off. The analysis for any three register elements in saturation and the remaining two register elements cut off is analogous to the foregoing analysis for A, B and C in saturation and D and E cut off by virtue of the similarity of the plurality gates and their associated register elements. Again, the validity of the analysis is independent of the designation of the register elements.

The number of different register combinations L which will affect a particular 2 out of 4 plurality gate of a five element register to maintain its associated register element in saturation is equal to six. Hence, each register element will be in saturation for six of the ten possible combinations. If the ten unique combinations of two register elements in a condition different from the remaining three elements are assumed to be combinations of two cut-off transistor register elements, it will be observed that element B appears in the combinations AB, BC, BD and EB. Since element B appears in four out of the ten possible cut-off combinations, it must appear in six of the saturated combinations of three elements each. Moreover, this will be true for every register element in the system.

A P out of N counter is implemented from a P out of N register by providing means for each impulse to be counted to induce a succession to the next predetermined one of the unique and stable states of the register. Each register element thus becomes a counter element.

The particular order of M unique and stable states through which a P out of N counter can progress should not, in practice, be entirely arbitrary. A consideration which mitigates against some orders of progression is one of economy. The count succession means for certain orderly progressions of counter states tends to be less complicated to realize than others and, therefore, is more economical. One constraint on the order of progression which it has been discovered is useful to impose is that two and only two out of the N counter elements will change conductive condition from one counter state to the next in the order of progression of counter states. One counter element will go from some conductive condition to a less conductive condition for the next counter state in order, and another counter element will go from some other conductive condition to a more conductive condition for the same next counter state in order. In this regard, there is an interchange of conductive conditions between two and only two counter elements upon succession of the counter from one of its M unique and stable states in order to the next one of its M unique and stable states.

In the illustrated embodiment of a counter in accordance with the present invention, a counting impulse of only one polarity is utilized, and this polarity is such as to affect an appropriate counter element to cut off on receipt of a counting impulse, from a saturated condition prior to receipt of the counting impulse. The one counter element affected, in turn, influences the other counter element of the differently conditioned pair which is not affected by the counting impulse to go from the cut-off state to the saturated state. However, it is to be understood that such count succession means are separate and independent from the plurality gate control means which, in turn, control the stability of the counter elements in each state. Rather, the count succession means alone directly influences the state of the counter elements which, in turn, influence the plurality gate control means to stabilize the states induced by the count succession means.

The P out of N registers already described achieve certain unique and stable conditions by interconnecting the register elements such that certain specified register elements control the condition of stability of certain other specified register elements through plurality gates. However, while active elements which are not of themselves capable of assuming any conditions of stability, e.g., transistors, are sufficient to implement a P out of N register, other active electron devices may be used to implement such registers. In this connection, there are extant in the art certain electron devices which of themselves are capable of exhibiting two or more conditions of stability. Among these are thyratrons, four layer diodes, silicon controlled rectifiers, tunnel diodes and the like. The two conditions of stability usually are a current conductive state and a cut-off state. It will be apparent that given N of these bistable register elements or the like, P out of these elements can be selectively placed in a condition different from the remaining $N-P$ elements and no control means such as plurality gates need be provided to maintain such bistable register elements in their particular stable states.

If a P out of N counter is implemented with the aforementioned bistable devices, it is manifest that the count succession means is independent of and distinct from the means for maintaining the counter stable in any one of its M unique and stable states. The stability means would be internal of the devices themselves. In such a case, the count succession means affects only the conductive conditions of a pair of differently conditioned counter elements so as to induce an interchange of conductive conditions between the elements of the pair. However, regardless of how the register function for a P out of N counter is implemented, the count succession means and only the count succession means determines which one out of the N counter elements will change its condition on receipt of a counting impulse. Furthermore, only the count succession means determines which other differently conditioned counter element from the said one element will be influenced to interchange conditions with the said one counter element by the said one counter element.

Referring now more particularly to FIG. 3, there is shown a 2 out of 5 decade counter based upon the 2 out of 5 decade register in FIG. 2. In this connection, like reference numerals indicate like or corresponding parts in the embodiments of the invention shown in FIGS. 2 and 3.

The plurality gates 11–15 are of the 3 out of 4 type, and the decade counter is designed to operate with two counter elements in saturation and three counter elements cut off for each of the ten unique and stable counter element combinations.

FIGS. 4*a*–4*e* illustrate the waveforms for the five counter elements A–E of the 2 out of 5 decade counter in FIG. 3. Specifically, the waveforms are the voltage variations with time for the collectors of the counter element transistors. Time is assumed to get later in all the waveforms shown in FIGS. 4 and 4*a*–4*i* from left to right. FIG. 4 shows the counting impulses which induce the counter to progress through the order of counter states. These counting impulses are numbered in order from "0" through "9" and then back to "0." Since time gets later to the right, the time period between any two counting impulses represents the length of time the counter remains in the state corresponding to the defined number value of the earlier of the two counting impulses. For example, between count "2" and count "3," the counter is in the "2" state. Count "3" will induce the counter to progress to the "3" state.

FIG. 5 defines the counter states corresponding to numerical values. These are arranged in ascending numerical value order from top to bottom. The counter element pairs are the 2 out of the 5 counter elements which are in saturation for a defined count value, the other 3 counter elements being cut off. For example, count "0" is defined as A and B in saturation. Count "5" is defined as C and E in saturation. These definitions of counter states corresponding to certain numerical values are entirely arbitrary. Any counter state could have been chosen for "0." The only requirement, after having chosen some one counter state for a particular numerical value, is that the counter state next in sequence represent the next numerical value in order. It will be observed that from one count to the next, only one counter element goes from cut off to saturation and only one counter element goes from saturation to cut off. For example, from count "4" to count "5," D goes off and E goes to saturation.

The potential of a saturated counter element collector in FIG. 3 is only a few tenths of a volt negative with respect to ground. All transistor emitters are grounded. The potential with respect to ground of a cut-off collector is about −7.5 volts. The collector resistors, e.g., R1, are connected to the negative 12 volt supply. For a cut-off transistor, the load resistor must carry the current which passes through the plurality gate legs. This accounts for the voltage drop from the −12 volts of the collector supply to the actual collector potential of approximately −7.5 volts for cut off. The counter element waveforms in FIGS. 4*a*–4*e* reflect these two collector potential levels for saturation and cut off. For example, element A, according to FIG. 5, is in saturation for counts "0" and "1," cut off from count "2" through count "6," in saturation for counts "7" and "8," and cut off for count "9." The waveform for element A in FIG. 4*a* reflects this. For counts "0" and "1" the waveform is more positive than for counts "2" through "6" and for count "9." The waveform for counts "7" and "8" is at the same potential level as for counts "0" and "1." An analogous relationship holds true between FIG. 5 and FIGS 4*b*–4*e* for all of the other counter elements B–E, respectively.

In the sequence of counter states tabulated in FIG. 5, the two counter elements which interchange conditions are always adjacent each other. For example, from count "2" to count "3," adjacent elements C and D interchange conditions. From count "7" to count "8," adjacent elements D and E interchange conditions.

In FIGS. 4*a*–4*e*, the waveforms for all of the counter elements are similar, the only difference among them being that they are displaced from each other by a certain number of counting impulse periods. For example, the B waveform is displaced from the A waveform by an interval of two counting impulses. In going from element A through element E, each element waveform is delayed two counting impulse periods from the waveform just before it.

The 2 out of 5 decade counter in FIG. 3 is reset by means of a normally closed pushbutton switch 20. A resistor R7 is connected between one contact terminal of the reset switch 20 and the positive 12 volt source which is the positive polarity supply for the entire decade counter. The other contact terminal of the reset switch 20 is connected to one side of a resistor R8, the other side of the latter resistor being connected to the negative 12 volt source. R8 is of lower resistance than R7 so that, with the reset switch normally closed, junction point 200 is at a negative potential with respect to ground. The magnitude of this negative potential will fall in the range from about 1.5 to about 2.5 volts.

Diodes D1, D2 and D3 have their anodes connected to junction point 200. The cathodes of the diodes D1, D2, D3 are connected individually to the base electrodes (not shown) of counter elements C, D and E, respectively. In one state of a counter element, the base of that counter element will be positive with respect to ground by about 1 volt, whereas in the other state of the counter element, the base will be negative by a few tenths of a volt. Hence, with reset switch 20 normally closed, diodes D1, D2 and D3 are blocked for current flow.

When the reset switch 20 is pushed to its open position, the resistor R8 is disconnected from the junction point 200. Hence, the anodes of the diodes D1, D2 and D3 are connected through the resistor R7 to the 12 volt positive supply to render the three diodes conductive. Resistor R7 limits the magnitude of the current flowing through the diodes. The transistor bases of the counter elements C, D and E are pulled positive with respect to ground and elements C, D and E are thus cut off. Hence, counter elements A and B are forced into saturation and the counter is thus in the defined "0" state. A capacitor C1 is connected between the junction point 200 and ground to limit any transients arising from the making and breaking of the reset switch 20. After the decade counter has assumed the "0" state, the reset switch 20 is released and returns to its normally closed position.

It will be apparent to those of ordinary skill in the art that the aforedescribed reset means can also be used with the registers of FIGS. 1 and 2 to place such registers in any desired state. In this connection, a separate reset means would be provided for each desired state of the register.

An AND gate 22 enables the counter element B in FIG. 3 to change from its saturation state to its cut-off state in going from count "0" to count "1." The AND gate 22 includes a pair of resistors R9, R10 of equal resistance value and a diode D4. One side of the resistor R9 is connected to the collector of counter element E, the other side of the resistor being connected to junction point 300 at the cathode of the diode D4. One side of the resistor R10 is connected to the collector of counter element C, the other side of the resistor also being connected to junction point 300. A capacitor C2 is connected between junction points 100 and 300 to provide D.C. isolation between these junction points.

The other AND gates 21, 23, 24 and 25 utilize the same circuit configuration as the AND gate 22, except that their resistors are connected to the collectors of different counter elements. In this connection, the resistors R9 and R10 in AND gate 22, and the corresponding resistors in the other AND gates 21 and 23–25, should have large values of resistance relative to the collector load resistors of the counter element transistors so that they do not excessively load the counter element stages. The collectors of counter elements C and E represent the two control inputs to the AND gate 22. FIG. 6 shows a tabulation of such control inputs for all of the AND gates of the five counter elements. The capacitors C3, C4, C5 and C6 are connected in the same manner and serve the same function for each of their respective counter element stages as the capacitor C2 for counter element B.

Let us assume that the decade counter is initially in to the "0" state. Then counter elements A and B are in saturation. Control inputs from counter elements C and E to the gate 22 are both at a negative potential of approximately −7.5 volts with respect to ground. Junction point 300 is at this same potential with respect to ground as the cutoff collectors of the counter elements C and E. On the other hand, if counter elements C and E were both in saturation, junction point 300 would be only a few tenths of a volt negative with respect to ground. With one of the counter elements C, E in saturation and the other element cut off, junction point 300 would have a potential midway between a few tenths of a volt negative with respect to ground (saturation voltage) and −7.5 volts (cut-off collector voltage). This occurs because the resistors R9 and R10 are equal in value.

Counting impulses are fed in at the input terminal 400 of the counter and are coupled via a capacitor C7 to junction point 500 and the anode of the diode D4 of AND gate 22. The counting impulses are positive pulses of approximately 3.75 volts amplitude.

Junction point 500 is connected through a resistor R11 to a junction point 600, both of these junction points being at the same potential in the absence of a counting impulse at the input terminal 400. Junction point 600 is maintained at a potential of approximately −7.5 volts with respect to ground. The latter is accomplished by a voltage divider comprising a pair of resistors R12 and R13 connected in series between the −12 volt supply and ground.

In each of the AND gates 21, 23, 24 and 25, the anodes of the diodes (not shown) corresponding to the diode D4 in the AND gate 22 are connected to junction point 500. Since the cathodes of each of these diodes cannot exceed a potential of −7.5 volts relative to ground, e.g., the junction point 300 in gate 22, it will be apparent that none of these diodes are forward biased and none of the diodes can conduct current in the absence of a counting impulse at input terminal 400.

A capacitor C8 is connected between junction point 600 and ground to bypass transiets.

The values of the capacitor C7 and resistor R11 are selected so that their product represents a time constant which substantially differentiates any pulse width which is greater in time than the magnitude of the time constant. Pulses having a pulse width which is smaller than the time constant will appear at junction point 500 unaltered in width. In this connection, the time width of the input capacitor-resistor combination, C7 and R11, should be large enough in conjunction with the counting impulse time width to hold a counter element in the cut-off state long enough for the counter stability system, i.e., the plurality gates 11–15, to lock the counter into its new stable state.

Referring to the tabulation of counter states in FIG. 5, in order to pass from the "0" state wherein counter elements A and B are in saturation to the "1" state wherein counter elements A and C are in saturation, at least counter element B must be cut off. Counter element B must again be cut off in order to pass from the "3" state wherein elements B and D are in saturation to the "4" state wherein elements C and D are in saturation. To obtain the "1" state, C must also be set in saturation, and to obtain the "4" state, C again must be set in saturation.

With counter elements A and B in saturation, junction point 300 is about 7.5 volts negative with respect to ground. Junction point 500 is also maintained at about 7.5 volts negative with respect to ground so that a positive counting impulse at junction point 500 will drive the anode of diode D4 positive. The diode D4 thus passes the counting impulse which is coupled through capacitor C2 to the base of counter element B. The counting impulse is of positive polarity and, hence, counter element B is cut off for at least the duration of the counting impulse. In this regard, the magnitude of the capacitor C2 should be sufficiently large to pass enough of the counting impulse to adequately cut off the counter element B.

If a negative impulse is received at the input terminal 400, capacitor C7 will pass this negative impulse to the anode of diode D4. However, such a negative impulse at the anode of diode D4 will merely block the diode against passage of current. In this regard, since AND gates 21, 22, 23, 24 and 25 are all schematically identical, a negative impulse at input terminal 400 has no effect at all upon the state of the counter.

A counting impulse is enabled to pass through gate 22 to the transistor base of counter element B only when both counter elements C and E are cut off. When only one of the counter elements C or E is cut off and the other counter element is in saturation, then junction point 300 of the gate 22 is at a voltage of approximately −3.75 volts with respect to ground. Junction point 500 rests quiescently at about −7.5 volts with respect to ground. Under these conditions, diode D4 is blocked against current conduction and, since the counting impulse has an amplitude of about +3.75 volts, the anode of diode D4 can only be brought to approximately the cathode potential but will not exceed the cathode potential sufficiently to induce any significant current flow through the diode. Hence, with counter element C in a conductive condition different from counter element E, gate 22 will not enable a counting impulse to pass through it.

For both counter elements C and E in saturation, junction point 300 is a few tenths of a volt negative relative to ground, and junction point 500 is again at about −7.5 volts with respect to ground. Thus, for these quiescent conditions, diode D4 is blocked against current conduction by about 7.5 volts. For a positive counting impulse of about 3.75 volts, the anode of diode D4 is still at a potential of −3.75 volts with respect to the cathode. Consequently, gate 22 is again disabled for the passage through it of a counting impulse.

For the "0" and "3" states of the counter, counter elements C and E are both cut off. Hence, for both of these states, gate 22 is enabled for the passage through it of a counting impulse at counts "1" and "4," respectively. It will be observed from FIG. 5 that counter elements C and E are also cut off for the "7" state. Therefore, gate 22 must also enable the passage through it of a counting impulse at count "8." If counter element B were in saturation during counter state "7," B would be turned off at count "8." However, counter element B is manifestly already off and, hence, the enablement of gate 22 at count "8" has no undesired effect.

For counter element A, gate 21 enables the passage of a counting impulse on counts "9" and "2" to turn off the element A. Gate 21 also enables the passage of a counting impulse on count "6," but element A is already off.

For counter element C, gate 23 enables the passage of a counting impulse on counts "3" and "6" to turn off the element C. Gate 23 also enables the passage of a counting impulse on count "0," but element C is already off.

In a like manner, for counter element D, gate 24 enables the passage of a counting impulse on counts "5" and "8" to turn off the element D. Gate 24 also enables the passage of a counting impulse on count "2," but element D is already off.

Similarly, for counter element E, gate 25 enables the passage of a counting impulse on counts "7" and "0" to turn off the element E. Gate 25 also enables the passage of a counting impulse on count "4," but element E is already off.

Each counter element is thus enabled by an associated gate controlling the passage of a counting impulse to the counter element to change the conductive condition of the counter element twice from saturation to cut off for every group of ten consecutive counting impulses. In essence, the five gates 21–25 perform an "ANDING" function whereby they "AND" the counting impulse and two control inputs.

The foregoing analysis regarding the enablement and disablement of the gate 22 is equally applicable to the other four AND gates 21, 23, 24 and 25 since they differ only in the counter elements from which they receive their pairs of control inputs. For gate 23, for example, the foregoing analysis for gate 22 would be applicable if the designation of each counter element is advanced one counter element ahead. Hence, for element C, read D. For element E, read A, and so on. The control elements column in FIG. 6 indicates this relationship.

FIG. 4*f* illustrates the voltage waveform for the junction point 300 of the gate 22 in FIG. 3. The rounding off of edges in the waveform is due to the time constant of the resistors R9 and R10 and capacitor C2 in gate 22. This rounding off or delay at junction point 300 is actually helpful since the gate 22 is thus held enabled throughout the delay period and this tends to insure counter element B being held off for the appropriate transition period required to stabilize the new counter state. The junction points analogous to junction point 300 in all of the other AND gates 21 and 23–25 in the decade counter of FIG. 3 have waveforms similar to the waveforms for junction point 300 except for a displacement in time relative to the junction point 300 waveform. In this regard, the analogous junction point of each AND gate has a waveform two counting impulse time periods later than the waveform for the corresponding junction point of the preceding AND gate. For example, the junction point waveform for gate 22 is two counting impulse periods later than for gate 21, and the waveform for gate 21 is two time periods later than for gate 25.

The aforedescribed gating concept is referred to as half gating and employs a minimum of diodes in each gate. The gating arrangement makes use of a resistive voltage divider of two equal resistances, e.g., R9 and R10, which divides in half the voltage swing of the counter elements. This economical gating arrangement requires that the signal to be gated be equal to approximately one-half the amplitude of the voltage swing of an output terminal of the two controlling active elements.

For input amplitudes greater than one-half the collector swing of the counter elements in FIG. 3, a compensation can be made by moving the junction point 600 more negative such that the most positive excursion which can be achieved by junction point 500 on receipt of a counting impulse is to a potential of approximately −3.75 volts.

In addition to turning a saturated counter element off, it is also necessary that the counter element in turning off influence another appropriate counter element so that the latter element turns on. In this connection, when a PNP junction transistor is rapidly turned off, a negative transient is produced at the collector which can be employed for influencing another PNP junction transistor to assume a conducting condition. In this manner, a first counter element which has its state of conduction altered by receipt of a counting impulse can influence a second counter element to also change its state of conduction even though the second counter element is not directly affected by the counting impulse.

By way of example, let it again be assumed that the counter in FIG. 3 is in the "0" state; i.e., counter elements A and B are both in saturation. A positive counting impulse is applied to the input terminal 400. Counter element B is thus turned off, and it is desired that the turning off of element B shall influence counter element C to turn on. The counter would then be in the "1" state. This influencing is accomplished by condition interchange means in the form of a turn-on filter 33 which is connected between the collector of the counter element B transistor and the base of the counter element C transistor.

It might at first be thought that a capacitor alone would suffice for transferring the negative transient from the collector of counter element B as it is turned off to the base of counter element C. However, a capacitor would transfer not only the negative transients when the associated counter element turned off but positive transients as well whenever the asociated counter element turned on. In order to go from the "0" state with counter elements A and B in saturation to the "1" state with elements A and C in saturation, element B must go off and element C must go on. However, in going from the "1" state with counter elements A and C in saturation to the "2" state with elements B and C in saturation, element B must go on and element A must go off. A capacitor would transfer the positive transient produced by counter element B going on to the base of counter element C as the "2" state is being achieved and this would influence element C to go off. By definition, however, the "2" state of the counter requires element C to be in saturation and, hence, positive transients from the collector of element B must be prevented from reaching the base of element C. Analogously, positive transients from the collector of any counter element must not be passed to the base of another counter element when the latter element is to be influenced on by the former element only when the former element turns off upon receipt of a counting impulse. In the embodiment of the invention herein described, the counter element influenced on is always one element ahead of the counter element which turns off on receipt of a counting impulse. For example, for the counter in FIG. 3, counter element B must influence element C on, and counter element E must influence element A on.

Hence, the turn-on filters 31, 32, 33, 34 and 35 pass only negative transients and each turn-on filter is connected between the collector of one counter element transistor and the base of the counter element transistor ahead of it. The circuitry for all of the turn-on filters 31–35 is identical and this circuitry is illustrated in FIG. 3 for the turn-on filter 32 connected between counter elements A and B.

Assume that the counter is in the "1" state so that counter elements A and C are in saturation. A counting impulse at count "2" is received which causes counter element A to go off. The collector of counter element A is pulled to —7.5 volts, and this negative going excursion is applied to a capacitor C9 which is connected in series with a resistor R14 between the collector element A and the base of element B. The capacitor C9 is sufficiently large so that it passes the negative transient from counter element A with sufficient time duration to adequately accomplish the interchange of conditions between counter elements A and B. A diode D5 is connected in parallel with the resistor R14 and is so oriented that it offers little resistance to the passage of a negative transient by capacitor C9 to junction point 100 at the base of counter element B. The resistor R14 is provided to allow capacitor C9 to adjust to the new voltage conditions at its terminals upon counter elements A and B assuming their new states.

When the counter is in the "9" state, counter elements E and B are both in saturation. Counter element E must be turned off by a counting impulse on count "0" and counter element A must be influenced by element E to turn on. The collector of counter element A goes positive as element A goes on. The capacitor C9 passes the latter positive transient, but the diode D5 is oriented so that it blocks the positive transient. Resistor R14 is a sufficiently high resistance so that not enough of the positive transient passes through it to the base of counter element B to effect the latter element. Hence, while the negative or turn-on transient is passed forward; i.e., from A to B, from B to C, from C to D, from D to E and from E to A, the positive or turn-off transient is effectively blocked from this sequence.

A 2 out of 5 decade counter with two counter elements in saturation and three counter elements cut off is operable in the aforedescribed manner with the AND gates 21–25 controlling the turn-off of specific counter elements on receipt of a counting impulse and the turn-on filters 31–35 connected so that the specific counter element turn off influences another specific counter element to turn on.

In the 2 out of 5 decade counter described, the counting impulse directly affects the counter element at its control terminal. The transient condition for counter element turn off is not a function of the plurality gate conditions. The counting impulse forces the counter to assume the next predetermined counter state in sequence on a transient basis. The new predetermined counter state is held long enough by the count succession system so that the plurality gates comprising the count stability system can respond to the new counter state and maintain the new counter state stable.

Although the operation of counter element turn-off can be accomplished entirely by the counting impulse, it is also possible to reinforce such turn-off of a counter element by an additional condition interchange means in the form of a turn-off filter which connects the base of the counter element transistor it is desired to turn off to the collector of the other counter element transistor of the pair which interchange conductive conditions. These are the turn-off filters 41, 42, 43, 44 and 45 shown in FIG. 3. Turn-off filter 42 is shown schematically and all the other turn-off filters 41 and 43–45 employ identical circuitry and function in the same manner as the turn-off filter 42. The turn-off filter terminal connections are in the opposite sense to the turn-on filters 31–35, i.e., E collector to D base, D collector to C base, C collector to B base, B collector to A base and A collector to E base. The function of the turn-off filter is to pass only positive transients from the collector of one counter element transistor to the base of another counter element transistor. A positive transient tends to turn off a PNP junction transistor, hence the term turn-off filter.

With the decade counter in the "1" state, counter elements A and C are in saturation. The next counting impulse turns counter element A off by the enablement of gate 21. In turning off, counter element A influences counter element B to turn on through the turn-on filter 32. In going on, the collector of the counter element B transistor swings in the positive direction. This positive transient is applied to a capacitor C10 which is connected in series with a resistor R15 between the collector of counter element B and the base of counter element A. A diode D6 is connected in parallel with the resistor R15 and is oriented so that its cathode is also connected to the base of the counter element A transistor. Capacitor C10 passes the positive transient from the collector of counter element B to the anode of the diode D6. Because of the orientation of the diode D6, the diode offers little resistance to the passage of the positive transient through it. The positive transient is thus transmitted to the base of the counter element A to reinforce the turning off of element A. Resistor R15 allows capacitor C10 to adjust to the new voltage conditions at its terminals upon counter elements A and B assuming their new states.

The aforedescribed operation is the same when the counter is in the "8" state and counter elements E and A are on. The next counting impulse again turns off counter element A by enablement of gate 21. Counter element B is influenced to turn on by means of turn-on filter 32, and turnoff filter 42 then reinforces the turning off of counter element A. The "9" state is thus achieved with counter elements E and B in saturation.

As in the case of the turn-on filters previously described, a capacitor alone cannot be used to convey the positive transient from the collector of counter B to the base of counter element A because it would also convey negative transients as well. However, diode D6 is so oriented that it will block negative transients from the collector of counter element B. Resistor R15 is sufficiently high in resistance so that no effective negative transient can reach the base of counter element A from the collector of counter element B.

Although the turn-off filters 41–45 are not absolutely necessary for the operation of the 2 out of 5 decade counter in FIG. 3, they do enhance the performance reliability of the counter at higher counting impulse frequencies.

The 2 out of 5 decade counter of FIG. 3 is an unweighted counter since the counter element waveforms shown in FIG. 4 are all alike except for relative time displacement. The waveforms also indicate that no single one of the five waveforms can be used as a "carry," since each of the waveforms has two positive excursions and two negative excursions in ten counts. Therefore, if it is desired to drive a succeeding decade counter stage, additional circuitry must be provided to obtain a carry signal.

In FIG. 3, there is shown a carry gate 50 having three inputs from the collectors of counter elements A, C and D. The half gating principle is again employed to derive the carry output signal. In this connection, the carry pulse output amplitude is equal to approximately half the collector voltage swing of a counter element, e.g., +3.75 volts, and this half amplitude provides the counting impulse for a succeeding decade counter stage of the same type as that shown in FIG. 3.

A pair of carry gate control input resistors R16 and R17 are connected between the collectors of counter elements C and D, respectively, and a junction point 700 within the carry gate 50. The resistors R16 and R17 are of equal resistance and are large compared with the load resistors of the counter element transistors to minimize loading. Hence, when counter elements C and D are both in saturation, junction point 700 is substantially at the saturation potential of the transistor collectors.

A pair of resistors R18 and R19 are connected in series between the −12 volt supply and ground to form a potential divider, the relative magnitudes of the two resistors R18 and R19 being such that the junction point 800 between them is maintained at a potential of approximately −11.25 volts with respect to ground. Capacitor C11 merely serves to bypass transients from the junction point 800 to ground.

The anode of a diode D7 is connected through a resistor R20 to the junction point 800, the cathode of the diode being connected to the junction point 700. Since the anode of the diode D7 is always quiescently more negative than the cathode of the diode, the diode normally conducts no current.

If both counter elements C and D are cut off, junction point 700 is at about −7.5 volts with respect to ground, whereas if only one of the counter elements C or D is cut off, junction point 700 is at about −3.75 volts with respect to ground. In either of these two cases, as well as for the case previously described wherein C and D are both in saturation, the diode D7 is blocked against conduction of quiescent current. The waveform for the junction point 700 within the carry gate 50 is shown in FIG. 4*g*.

A capacitor C12 is connected between the anode of the diode D7 and the collector of counter element A. Capacitor C12 is of such size that, in conjunction with resistor R20, the waveform of the collector of counter element A is differentiated. The differentiated collector A waveform is shown in FIG. 4. The amplitude from the center line of the positive and negative excursions is about equal to the collector voltage swings and is about 7.5 volts. These excursions appear at the anode of diode D7. Since, quiescently, diode D7 is blocked against passage of current, the diode blocking will be even further enhanced when the anode is driven more negative. This occurs at counts "2" and "9."

Positive excursions of approximately 7.5 volts occur at counts "0" and "7." At count "7," counter element C is cut off and element D is in saturation. Hence, junction point 700 is at a potential of about −3.75 volts with respect to ground. Since the anode of diode D7 is held at −11.25 volts with respect to ground, a positive excursion of about 7.5 volts will just bring the anode of the diode to a potential of −3.75 volts so that the diode has a net voltage across it of zero volts. Under these conditions, little or no current is passed by the diode.

At count "0," counter elements C and D are both cut off and consequently junction point 700 is at a potential of −7.5 volts with respect to ground. Hence, a positive excursion of about 7.5 volts at the anode of diode D7 drives the diode anode about 3.75 volts more positive than the quiescent potential of the junction point 700. The anode of diode D7 is quiescently at −11.25 volts with respect to ground. Diode D7 has about 3.75 volts of net reverse voltage across it before count "0." At count "0," the diode D7 passes the carry pulse shown in FIG. 4*i* at an amplitude of approximately +3.75 volts. Hence, the carry gate 50 essentially performs at "ANDING" function in that it "ANDS" the waveform of the counter element A collector with two control inputs from the collectors of counter elements C and D. Carry signal output terminal 900 is connected to the counter input terminal (not shown) of the next decade counter stage for cascading.

The aforedescribed counting apparatus satisfies a long existing need in the art for a high speed counting device which is extremely reliable, yet at the same time relatively simple and economical to fabricate.

It will be apparent from the foregoing that, while particular forms of my invention have been illustrated and described, various modifications can be made without departing from the spirit and scope of my invention. Accordingly, I do not intend that my invention be limited, except as by the appended claims.

I claim:

1. An electronic counter, comprising:

a plurality of N counter elements, each counter element being capable of exhibiting two distinguishable states, P counter elements always being stable in a first condition and the remaining $N-P$ counter elements always being stable in a second condition for $$\frac{N!}{P!(N-P)!}$$

different combinations where $$(N-1)>P>1$$

and N and P are both integers, said first and said second conditions corresponding to the two distinguishable states of each counter element, each of said different combinations representing a different counter state;

counting pulse receiving means;

gating means connected to said receiving means for selectively changing the state of predetermined counter elements, one at a time upon receipt of a counting pulse by said receiving means; and condition interchange means independent of said gating means and responsive to the change of state of one of said counter elements by said gating means to induce only a predetermined one other of said counter elements into the distinguishable state assumed by the first said one of said counter elements prior to receipt of said counting pulse.

2. An electronic counter as set forth in claim 1, including reset means for forcing said counter into one particular one of said different combinations to index said counter prior to the application of any counting pulses.

3. An electronic counter as set forth in claim 1, including carry means for providing a carry pulse out of said counter indicating receipt of a predetermined number of counting pulses by said counter.

4. Electronic counting apparatus, comprising:

a plurality of N counter elements;

logic means interconnecting said N counter elements for maintaining P counter elements stable in a first condition and the remaining $N-P$ counter elements stable in a second condition for $$\frac{N!}{P!(N-P)!}$$

different combinations where $$(N-1)>P>1$$

and N and P are both integers, each of said combinations representing a different counter state;

counting pulse receiving means;

gating means connected to said receiving means and to each of said counter elements for directly enabling the change of state from said first condition to said second condition of only one predetermined counter element upon receipt of a counting pulse; and individual condition interchange means independent of said gating means and said logic means and connected between a prescribed differently conditioned pair of counter elements for each of said $$\frac{N!}{P!(N-P)!}$$

combinations, each condition interchange means influencing a direct interchange of conditions between the counter elements of each differently conditioned pair only when a change of condition of one counter element of each said differently conditioned pair is enabled by said gating means upon receipt of a counting pulse to change the counter state.

5. Electronic counting apparatus as set forth in claim 4, including reset means for forcing said counting apparatus into one particular one of said different combinations to index said counting apparatus prior to the application of any counting pulses.

6. Electronic counting apparatus as set forth in claim 4, including carry means for providing a carry pulse out of said counting apparatus indicating receipt of a predetermined number of counting pulses by said counting apparatus.

7. Electronic counting apparatus, comprising:

a P out of N register having N register elements each capable of exhibiting two distinguishable stable conditions and wherein P register elements are stable in a first condition and the remaining $N-P$ register elements are stable in a second condition for $$\frac{N!}{P!(N-P)!}$$

different combinations where $$(N-1)>P>1$$

and N and P are both integers, each of said different combinations representing a different count, each register element having an output terminal and at least one input terminal;

counting pulse receiving means;

gating means connected to said receiving means and to each of said register elements for directly enabling the change of state from said first condition to said second condition of only one predetermined register element upon receipt of a counting pulse; and individual condition interchange means for a prescribed differently conditioned pair of register elements for each of said different combinations, each condition interchange means being independent of said gating means and connected between the output terminal of one of said register elements of said pair and the input terminal of the other of said register elements of said pair, each condition interchange means influencing a direct interchange of conditions between the register elements of each differently conditioned pair only when a change of condition of one register element of each differently conditioned pair is enabled by said gating means upon receipt of a counting pulse to change the counter state, said register element output terminal providing the only means through which one register element can influence the change of condition of another register element.

8. Counting apparatus as set forth in claim 7, wherein $N=5$ and further including carry means for providing a carry pulse out of said counting apparatus upon receipt of ten counting pulses by said counting apparatus.

9. Counting apparatus as set forth in claim 7 wherein said individual condition interchange means includes:

first condition interchange means connected between a differently conditioned pair of register elements for each of said different combinations to directly influence an interchange of conditions between the register elements of each of said pairs only when a change of condition of a first register element of each of said pairs is changed in state via said gating means upon receipt of a counting pulse; and second condition interchange means connected between each of the same said differently conditioned pairs of register elements to further influence an interchange of conditions between the register elements of the same pair, the register element which has not been directly changed in state through said gating means serving to reinforce the change of state of the other register element of the same pair.

10. Counting apparatus as set forth in claim 9, wherein said first condition interchange means and said second condition interchange means are both characterized by substantially unidirectional conductivity.

References Cited

UNITED STATES PATENTS

| | | | |
|---|---|---|---|
| 3,051,853 | 8/1962 | Harper | 328—49 X |
| 3,087,075 | 4/1963 | Faulkner | 328—43 X |
| 3,283,256 | 11/1966 | Hurowitz | 328—43 X |
| 3,253,158 | 5/1966 | Horgan | 328—49 X |

MAYNARD R. WILBUR, *Primary Examiner.*

DARYL W. COOK, *Examiner.*

G. J. MAIER, *Assistant Examiner.*